Nov. 10, 1931.        S. V. E. TAYLOR        1,831,690
HYDRAULIC MECHANISM
Filed June 2, 1930        3 Sheets-Sheet 3

INVENTOR.
Scott V. E. Taylor
BY
Geo. P. Kimmel
ATTORNEY.

Patented Nov. 10, 1931

1,831,690

UNITED STATES PATENT OFFICE

SCOTT V. E. TAYLOR, OF AKRON, OHIO

HYDRAULIC MECHANISM

Application filed June 2, 1930. Serial No. 458,998.

This invention relates to a hydraulic mechanism and has for its object to provide a mechanism of such class, in a manner as hereinafter set forth, whereby an infinite variation of speed of a driven element can be obtained, with the driving means therefor rotating at a constant high speed and with the torque transmitted to the driven element increasing as its speed decreases.

If a cylindrical vessel is partly filled with liquid and made to rotate, the contained liquid acquires the angular velocity of the vessel and it exerts a hydrostatic pressure against the walls of the vessel whose magnitude is equal to the square of the velocity of the liquid at the point in question divided by the product $2g$ times the specific gravity of the liquid.

Accordingly if there is placed a spiral shaped pipe into the liquid, there will be a total head on the liquid flowing into the pipe, due not only to the hydrostatic pressure, but also a head due to the velocity of the liquid relative to the pipe, or the total head at its entrance will be equal to $$\frac{v^2}{2g} + (v-v_0)^2$$

where $v$ = average absolute velocity of the liquid over the cross sectional area of the pipe and $v_0$ = average absolute velocity of the pipe about the center of rotation.

Also if there is placed a vane in the rapidly moving liquid, the liquid will exert a force on the vane equal to the hydrostatic pressure of the fluid against it, normal to the axis taken through the vane plus the product of the mass of liquid that flows over the vane in one second of time and the difference in velocities at entrance and exit of liquid relative to the same axis and $(1-\cos a)$ where $a$ is the total angle through which the liquid rotates before leaving the vane. If $\cos a$ is made equal to zero, the total force of the liquid against the vane will evidently be a maximum for any given combination of speeds of the liquid and vane, which is exactly the condition existing in the hydraulic mechanism in accordance with this invention.

Further objects of the invention are to provide, in a manner as hereinafter set forth, a mechanism of the class referred to, which is comparatively simple in its construction and arrangement, strong, durable, compact, thoroughly efficient in its use, readily assembled and installed with respect to a driving means therefor, and comparatively inexpensive to manufacture.

With the foregoing and other objects in view the invention consists of the novel construction. combination and arrangement of parts as hereinafter more specifically described, and illustrated in the accompanying drawings, wherein is shown an embodiment of the invention, but it is to be understood that changes, variations and modifications can be restorted to, which fall within the scope of the claims hereunto appended.

In the drawings wherein like reference characters denote corresponding parts throughout the several views:—

Figure 1:
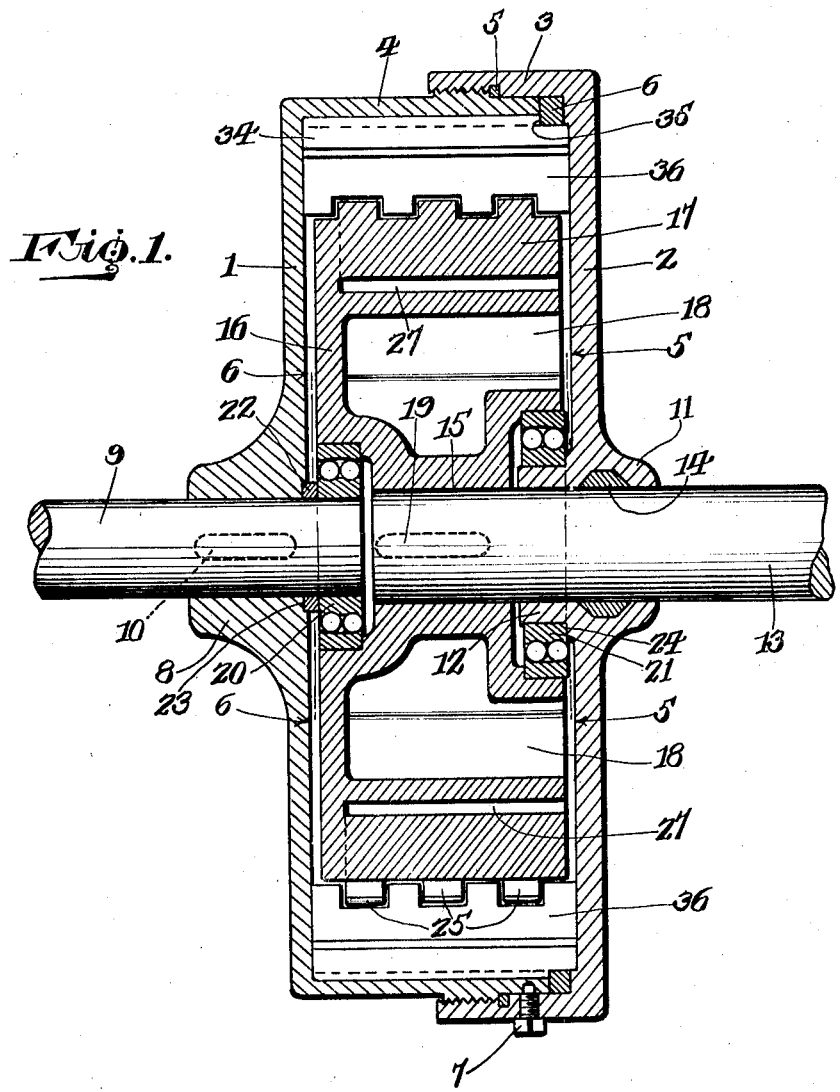
Figure 1 is a vertical section through a hydraulic mechanism in accordance with this invention taken at a point indicated by the line 1—1 of Figure 2.

Referring to the drawings in detail, the numerals 1 and 2 respectively indicate the front and rear sections of a substantially drum shaped housing, the section 2 having an annular wall 3 overlapping and threadedly connected with an annular wall 4 of the section 1. The connection between the sections is rendered fluid tight by means of a packing ring 5 adjacent the threads connecting the sections, and a packing ring 6 disposed between the section 2 and the free edge of the wall 4. Extending through the wall 3 and into the wall 4 is a set screw 7.

Centrally thereof, the section 1 is formed with an outwardly projecting boss 8 which is centrally apertured for the passage therethrough of a drive shaft 9. The boss 8 is preferably pressed on the shaft 9 and is further keyed thereto by means of a key 10 which extends longitudinally of the shaft 9. The section 2 is formed centrally thereof with an outwardly projecting boss 11 which is provided with a centrally disposed opening in alignment with the inner face of a flange 12 projecting inwardly from the section 2. Rotatably mounted with respect to the section 2, and extending through the boss 11 and flange 12 is a driven shaft 13. A fluid tight connection is provided between the section 2 and shaft 13 by means of a packing ring 14 which is disposed within a recess formed in the boss 11.

Disposed within the housing is a rotor of skeleton formation including a hub 15, an end wall 16 formed integrally with the forward end of the hub, a relatively thick annular wall 17 formed integrally with the end wall 16, and a plurality of radially projecting webs 18 formed integrally with the hub 15, end wall 16, and annular wall 17. The driven shaft 13 extends through the hub 15 and is keyed thereto by means of a key 19 extending longitudinally of the shaft 13. At the ends thereof the hub 15 is recessed to receive respectively bearing assemblies 20 and 21. The outer race of the bearing assembly 20 is fixedly secured with respect to the hub, and the inner race of such assembly is rotatably mounted on an inner end portion of the drive shaft 9. The bearing assembly 20 and wall 16 are maintained in spaced relation to the housing 1 by means of a spacer ring 22 which abuts the side face of the bearing assembly and which projects slightly into a counter bore 23 formed in the inner face of the section 1. The outer race of the bearing assembly 21 is fixedly secured with respect to the hub 15, and the inner race of such assembly is rotatably mounted on the annular flange 12. The bearing assembly 21 abuts against a shoulder 24 on the flange 12 to maintain the bearing assembly, webs 18, and wall 17 in spaced relation to the housing section 2.

The wall 17 is provided on its peripheral face with a plurality of ribs 25 arranged in spaced rows extending circumferentially of the wall, and with the ribs of each row being arranged in spaced relation and in longitudinal alignment. The forward end of each rib 25 merges into the wall 17, and the rib gradually increases in height toward the rearward end thereof. At the rearward end thereof, each rib 25 is formed with an arcuate recess 26, the wall of which extends in continuation of the forward wall of a fluid passage 27. There are the same number of fluid passages provided as there are ribs in each row. At one side thereof each fluid passage opens through the rear face of the wall 17, and at the opposite side thereof the fluid passage terminates a distance from the forward edge of the wall 17 substantially equal to the thickness of the wall 16. Lengthwise thereof the fluid passage extends throughout an arc of substantially 270° and consists of a forward portion 28 having a relatively small radius, a rearward end portion 29 extending radially of the wall 17, and an intermediate portion 30 disposed in concentric relation to the wall 17. The rearward wall of the forward portion 28 of each passage 27 extends in continuation of a rib 25 at the forward end of the latter. The rearward end of the next adjacent rib in a forward direction extends in overlapping relation to the following rib whereby the entrance to the portion 28 is disposed substantially concentrically to the axis of the rotor. The rearward end portion 29 of each passage opens through the peripheral face of the wall 17 in spaced relation to the entrance to the next adjacent passage. The ribs 25 provide a series of recesses 31 in the peripheral face of the wall 17.

Interposed between the wall 17 and the peripheral wall 4 of the section 1 are a pair of blade ring sections 32, each of which is of substantially semi-annular construction. The sections 32 are oppositely disposed with their opposing ends arranged in spaced relation. The end faces of the sections 32 are recessed as indicated at 33 for the reception therein of a pair of keys 34 which spread the sections 32 to maintain the same in engagement with the inner face of the wall 4. At the rearward ends thereof the keys 34 are recessed as indicated at 35 to receive the packing ring 6. Formed on the inner face of each section 32 are a plurality of spaced blades 36 which extend radially of the rotor. Each blade 36 is of rectangular shape in cross section and is formed in its inner face with a series of notches 37 for the reception therein of the rows of ribs 25. The notches 37 are of rectangular formation and provide a series of spaced, rectangular projections 38 on the inner face of each blade 36. The projections 38 fit within the recesses 31 formed on the peripheral face of the wall 17 by means of the ribs 25.

In assembling the mechanism, the section 1 is secured in position on the shaft 9, after which the spacer ring 22 is inserted over the inner end of the shaft 9 and into the counter bore 23. The bearing assemblies 20 and 21 are secured to the hub 15 and the latter is secured in position on the driven shaft 13. The blade ring sections 32 are then positioned in circumferential relation to the wall 17, after which the rotor and blade sections are inserted into the casing with the inner race of the bearing assembly 20 mounted on the inner end of the drive shaft 9. The keys 34 are then inserted between the end faces of the sections 32 to force the latter into contact with the inner face of the wall 4. The packing rings 5 and 6 are then inserted, after which the housing section 2 is slipped over the shaft 13 and threaded onto the wall 4, being locked in position by means of the set screws 7. The mechanism is then filled through an opening in the housing section 1 with a suitable liquid of high gravity, low viscosity, low freezing point, moderately high boiling point and lubricating qualities. After the filling of the mechanism the opening through the housing section 1 is closed by means of a plug 39.

Figure 2:
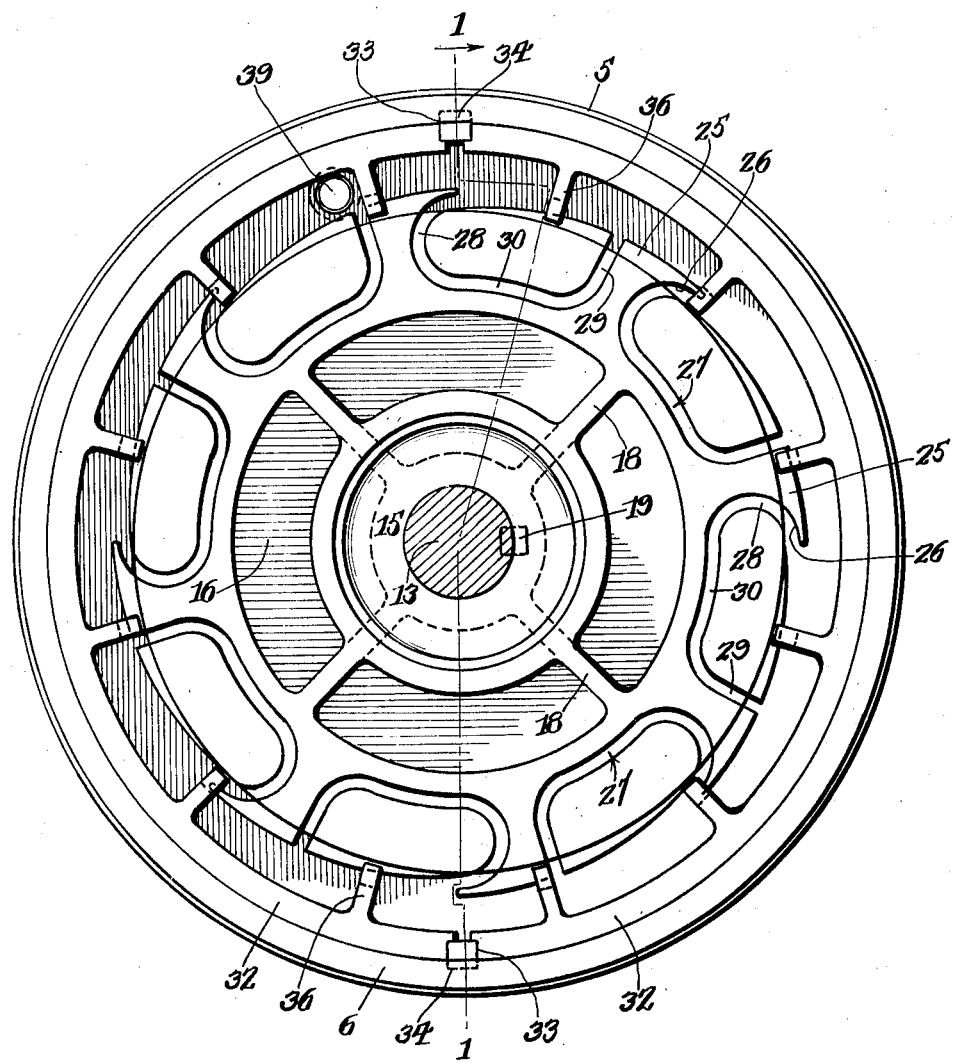
Figure 2 is an elevation of the mechanism with the rear housing section removed.
Figure 3:
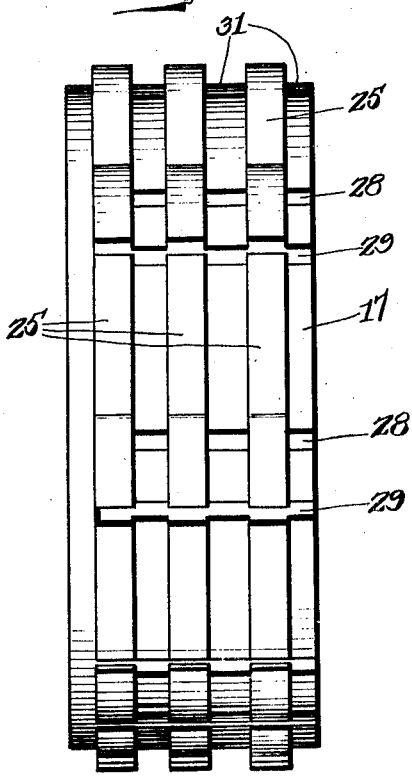
Figure 3 is an elevation of the rotor disposed within the housing.
Figure 4:
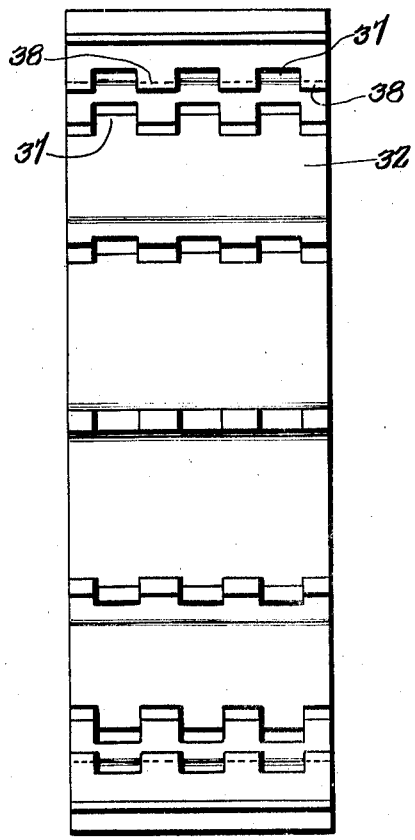
Figure 4 is an elevation of one of the blade ring sections.
Figure 5:
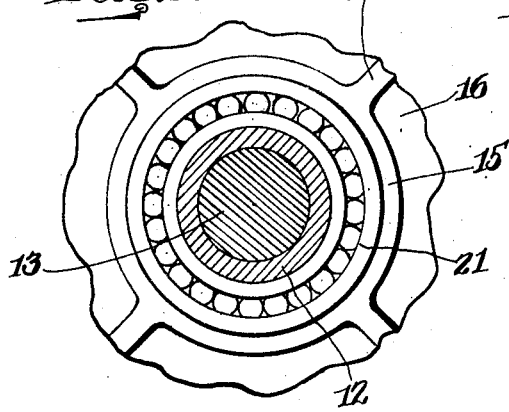
Figure 5 is a fragmentary section taken on the line 5—5 of Figure 1.
Figure 6:
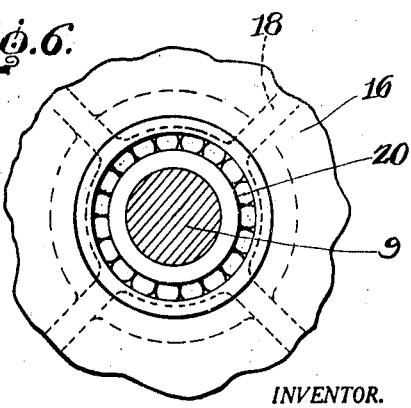
Figure 6 is a fragmentary section taken on the line 6—6 of Figure 1.

In the operation of the mechanism, the housing is rotated by means of the drive shaft 9 in a counter-clockwise direction as viewed in Figure 2. The blade ring sections 32 are rotated with the housing whereby the fluid within the housing is driven by the blades 36 into the end portions 28 of the passages 27 tangentially of the rotor. The fluid is discharged from the passages 30 through the end portions 29 in a radial direction with respect to the rotor and at a substantial distance from the entrances into the portions 28 to prevent the radially discharged liquid from interfering with the liquid about to enter the passages. The passage of the liquid through the passages 27 imparts its high kinetic energy to the rotor and also exerts a hydrostatic pressure against the entrance faces of the rotor, thereby converting the high speed and low torque of the drive shaft 9 into a low speed and high torque for the driven shaft 13. Owing to the rectangular cross sectional shape of the blades 36, and to the reception of the projections 38 and ribs 25 into the recesses 31 and 37 respectively, slippage of the fluid between the blades and rotor is substantially eliminated.

It is thought that the many advantages of a hydraulic mechanism in accordance with this invention will be readily apparent, and although the preferred embodiment of the invention is as illustrated and described, it is to be understood that changes in the size, shape and arrangement of parts may be resorted to, so long as such changes fall within the scope of the invention as defined in the appended claims.

What I claim is:

1. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said ribs and projections coacting with the recesses in the blades and rotor respectively to prevent slip of the fluid between the blades and rotor.

2. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, and a plurality of blades extending from the blade ring radially of the rotor and terminating adjacent the periphery of the latter to force fluid through said passages, said blades being rectangular in cross section to prevent slip of the fluid between the blades and rotor.

3. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said blades being rectangular in cross section.

4. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, and a plurality of blades extending from the blade ring radially of the rotor and terminating adjacent the periphery of the latter to force fluid through said passages, said passages having their entrances and outlets arranged in substantially spaced relation to prevent interference between the streams of fluid entering and leaving the passages.

5. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said blades being rectangular in cross section, said passages having their entrances and outlets arranged in substantially spaced relation to prevent interference between the streams of fluid entering and leaving said passages.

6. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said ribs and projections coacting with the recesses in the blades and rotor respectively to prevent slip of the fluid between the blades and rotor, said passages having their entrances and outlets arranged in substantially spaced relation to prevent interference between the streams of fluid entering and leaving said passages.

7. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, and a plurality of blades extending from the blade ring radially of the rotor and terminating adjacent the periphery of the latter to force fluid through said passages, said blades being rectangular in cross section to prevent slip of the fluid between the blades and rotor, said passages having their entrances and outlets arranged in substantially spaced relation to prevent interference between the streams of fluid entering and leaving said passages.

8. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said ribs and projections coacting with the recesses in the blades and rotor respectively to prevent slip of the fluid between the blades and rotor, said ribs having their forward ends merging into the peripheral face of the rotor and gradually increasing in height toward their rearward ends.

9. In a hydraulic mechanism for transmitting power at a reduction from a drive shaft to a driven shaft, a fluid containing housing adapted to be mounted for rotation with the drive shaft and for relative rotation with respect to the driven shaft, a rotor within the housing, said rotor being adapted to be mounted for rotation with the driven shaft and for relative rotation with respect to the drive shaft, said rotor being provided with a series of fluid passages having their entrances disposed tangentially of the rotor and further having their outlets disposed radially of the rotor, a blade ring mounted for rotation with the housing and disposed in circumferential relation to the rotor, a plurality of blades extending from the blade ring radially of the rotor to force fluid through said passages, and a plurality of spaced rows of spaced ribs formed on the peripheral face of the rotor, said blades being formed with recesses to receive said ribs therein and to provide projections adjacent said recesses, said spaced rows of ribs providing spaced recesses therebetween to receive the projections on the blades, said ribs and projections coacting with the recesses in the blades and rotor respectively to prevent slip of the fluid between the blades and rotor, said ribs having their forward ends merging into the peripheral face of the rotor and gradually increasing in height toward their rearward ends, said ribs being formed at their rearward ends with recesses having their walls extending in continuation of the forward walls of said passages at the forward ends of the latter.

In testimony whereof, I affix my signature hereto.

SCOTT V. E. TAYLOR.